United States Patent [19]

Phillis

[11] Patent Number: 4,867,487
[45] Date of Patent: Sep. 19, 1989

[54] QUICK CONNECT COUPLING

[75] Inventor: Robert L. Phillis, Covington, Ohio

[73] Assignee: General Motors Corporation, Detroit, Mich.

[21] Appl. No.: 277,722

[22] Filed: Nov. 30, 1988

[51] Int. Cl.⁴ .............................................. F16L 37/00
[52] U.S. Cl. .................................... 285/305; 285/332; 285/351; 285/423
[58] Field of Search ............... 285/351, 347, 305, 332, 285/423

[56] References Cited

U.S. PATENT DOCUMENTS 3,479,059 11/1969 Taylor et al. ................... 285/347 X
4,009,896 3/1977 Brewer ............................. 285/305

Primary Examiner—Dave W. Arola
Attorney, Agent, or Firm—A. Michael Tucker

[57] ABSTRACT

A quick connect and disconnect coupling includes a connetor for housing a fluid conduit. The conduit includes a flexible tube terminating in an upset bead. One or more adjoining O-ring seals encircle the tube adjacent the upset bead. The connector includes a plug for receiving the tube. The plug terminates in an end wall adjacent the O-rings. A first chamfer is provided in the plug end wall. A second chamfer is provided in the upset bead adjacent the O-ring seals. During installation and removal of the connector, the O-rings are compressed and forced into the first and second chamfers to retain the O-rings in place on the tube.

13 Claims, 1 Drawing Sheet

U.S. Patent  Sep. 19, 1989  4,867,487
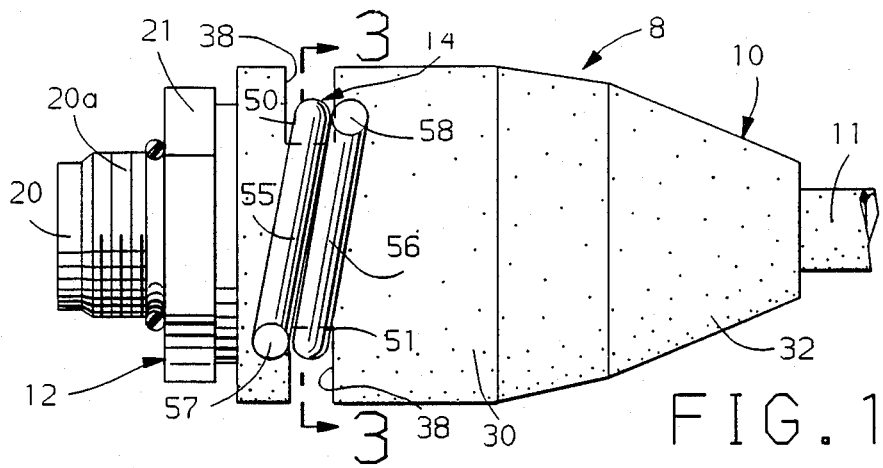
FIG. 1
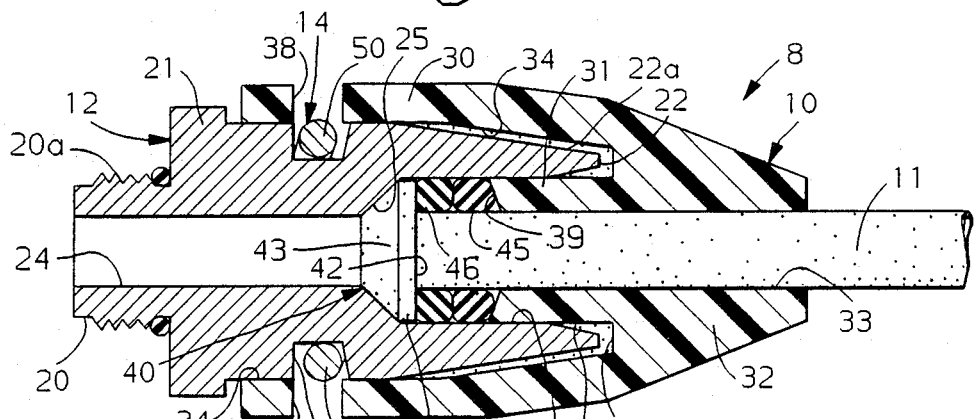
FIG. 2
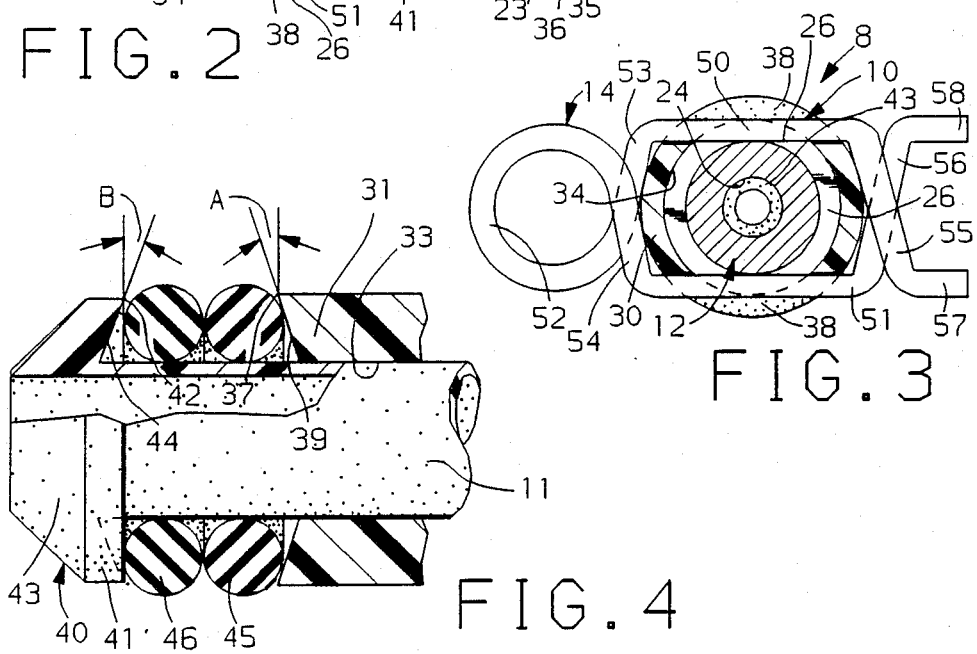
FIG. 3
FIG. 4

QUICK CONNECT COUPLING

BACKGROUND OF THE INVENTION

1. Field of the Invention

The present invention relates generally to a conduit coupling, and in particular is concerned with a quick connect and disconnect coupling.

2. Description of the Related Art

Quick connect and disconnect couplings are well-known in the art. In many devices, a housing surrounds a flexible tube. The housing is selectively attached and removed from a receptor to form a conduit coupling. Generally, a quick connect coupling includes at least one seal to prevent the escape of a fluid. Many couplings employ O-ring seals as part of the assembly.

U.S. Pat. No. 4,009,896, assigned to the assignee of this invention, discloses a quick connect coupling. The coupling includes a connector which receives a tube. The tube terminates in an upset bead to retain the tube in the housing. An O-ring seal encircles and is mounted on the tube adjacent to the upset bead to form a dynamic seal for the fluid conduit.

In particular applications, a seal tends to be displaced from its original position during installation and removal of a coupling. For example, an O-ring seal may be forced onto and/or over the shoulder of a retaining element of a coupling due to the force required to disconnect the coupling. When an O-ring seal is shifted and/or misaligned during disconnection, a proper seal may not form when the coupling is reconnected. Furthermore, a seal may be lost during the removal operation of the coupling, resulting in the loss of seal formation upon reconnection. Misalignment of seals is particularly acute in applications employing one or more O-ring seals.

The art continues to seek improvements. It is desirable that an improved quick connect coupling be capable of quick connection and disconnection without loss of seal formation. Furthermore, it is desirable that an improved coupling include a retaining element to prevent shifting of a seal from its original location during installation or removal of the coupling. It is particularly desirable that a retaining element be compatible with conventional O-ring seals.

SUMMARY OF THE INVENTION

The present invention provides a quick connect and disconnect coupling. The coupling can be quickly installed or removed without misalignment of a seal. The present coupling includes an economical retaining element that can be utilized with conventional seals, including O-ring seals.

The present invention includes a quick connect and disconnect coupling having a connector for housing a fluid conduit. The conduit includes a flexible tube terminating in an upset bead. One or more adjoining O-ring seals encircle the tube adjacent the upset bead. The connector includes a plug for receiving the tube. The plug terminates in an end wall adjacent the O-rings. A first chamfer is provided in the plug end wall. A second chamfer is provided in the upseat bead adjacent the O-ring seals. During installation and removal of the connector, the O-rings are compressed and forced into the first and second chamfers to retain the O-rings in place on the tube.

BRIEF DESCRIPTION OF THE DRAWINGS

FIG. 1 is an elevational view illustrating a preferred embodiment of the present coupling comprising a connector secured to an adapter by a spring retainer.

FIG. 2 is a sectional view of the coupling of FIG. 1 taken along the longitudinal axis of the coupling.

FIG. 3 is a sectional view of the coupling taken along line 3-3 of FIG. 1.

FIG. 4 is an enlarged, partially sectional view of a tube and plug of the coupling of FIG. 1.

DETAILED DESCRIPTION OF THE PREFERRED EMBODIMENT

A quick connect coupling of the present invention indicated generally at 8 in FIGS. 1-4, includes a plug member or connector 10 for connecting a fluid conduit in the form of a tube 11 to a socket member or fluid line adapter 12 in a fluid line. A plut portion of the connector 10 is adapted to be pushed into the socket end of the adapter 12 whereby the tube 11 is in fluid coupled assembly therewith. A spring retainer 14 is used to releasably retain the connector 10 and adapter 12.

Adapter 12 may be formed as an integral part of another mechanism, for example as the inlet or outlet of a pump or compressor, or as shown, it may be formed as a separate element for attachment in a known manner to such a pump or compressor. For example, in the structure illustrated, the adapter 12, of tubular configuration, is provided with a reduced diameter shank portion 20 at one end adjacent a wrenching head 21. Shank portion 20 includes threads 20a whereby the adapter 12 can be threadedly connected, for example, to a pump compressor. The wrenching head 21 is provided with suitable wrenching flats on its outer periphery.

Adapter 12 includes a stepped bore therethrough which forms in succession, starting at a socket end 22 (i.e. the end opposite shank portion 20), an inner, first annular wall 23 of a predetermined diameter and axial length to define a socket opening and a reduced diameter inner, second annular wall 24 forming a fluid passage. Walls 23 and 24 are interconnected by an intervening radial wall 25 which forms a frusto-conical seat for the tube 11 in a manner described below. First annular wall 23 may be tapered at its leading edge, as shown, to facilitate insertion of the plug element of the connector 10, to be described.

Adapter 12 includes an annular groove 26 on its outer peripheral surface between wrenching head 21 and socket end 22 to receive spring retainer 14 as described below.

Connector 10 includes a connector body means having a countersunk bored opening therethrough to provide at one end a cavity enclosed by a collar 30 encircling an annular plug 31 in spaced-apart relation and concentric with each other. Plug 31 and collar 30 are interconnected by a rear connector body portion 32. Body portion 32 and plug 31 have a continuous straight bore 33 therethrough of a sufficient diameter to slidably receive the tube 11. It will be understood that each of the above identified elements of the connector 10 may be formed as separate elements suitably secured to each other to form a unitary structure or, as shown, the connector 10 may be formed as an integral structure made of a suitable material, such as metal, or molded using a suitable plastic material, such as Nylon.

In the embodiment illustrated in FIGS. 1, 2 and 3, connector 10 is provided with a countersunk bored opening extending from and forming at the collar end. Straight bore 33 is concentric with the collar 30. The countersunk bored opening defines in sequence an annular inner peripheral wall 34 of the collar 30 having a diameter slightly greater than the outside diameter of the socket end 22 of the adapter 12 whereby the collar ends of the connector 10 can slidably encircle the socket end 22 of the adapter 12. A radially inwardly extending annular wall 35 terminates at the annular outer peripheral surface 36 of the plug 31. Outer peripheral surface 36 of the plug 31 extends a predetermined axial distance in a direction back toward the collar end of the connector 10. The outside diameter of the outer peripheral surface 36 of the plug 31 is sized so as to be slidably received in the inner annular wall 23 of the adapter 12.

Plug 31 terminates at an end wall 37 approximately perpendicular to the longitudinal axis of tube 11. End wall 37 is provided with a generally radial, axially-receding surface 39. In a preferred embodiment, surface 39 manifests a simple chamfer. However, receding surface 39 may be found to be similarly effective in the form of a partially-spherical or concave surface, a step-shouldered chamfer surface, etc. In simple chamfer form a preferred chamfer angle A between receding surface 39 and end wall 37 is approximately 30° as illustrated in FIG. 4. As described below, receding surface 39 retains O-ring seals mounted on tube 11 adjacent plug 31 during installation and removal of connector 10.

The outer peripheral surface of the connector 10, and specifically the outer peripheral surface of the collar 30, is provided with a pair of diametrically opposed slots 38 therethrough to receive the spring retainer 14. Slots 38 are axially located on the connector 10 so as to be in alignment with the annular groove 26 in the adapter 12 when the plug 31 of the connector 10 is fully inserted into the socket of the adapter 12.

The tube 11, which may be of any suitable material and in one construction, is a plastic tube made of Nylon having a nominal outside diameter of 0.122 inch and an inside diameter of 0.075 inch, is slidably received through the bore 33 in the connector 10. The end of the tube 11 inboard of the connector 10, i.e. the end extending outwardly from the annular plug 31 into the cavity provided by collar 30, is provided with an enlarged head or annular upset bead 40. In the construction illustrated in FIGS. 2 and 4, upset bead 40 includes an annular rim 41 having an outside diameter slightly smaller than the inside diameter of the wall 23 of the socket end 22 in the adapter 12, and terminates in a frusto-conical end surface 43 of a configuration corresponding to the inclined radial wall 25 forming the frusto-conical seat in the adapter 12.

Upset bead 40 includes an end wall 42 approximately perpendicular to the longitudinal axis of tube 11. End wall 42 is provided with a generally radial, axially-receding surface 44. In a preferred embodiment, receding surface 44 manifests a simple chamfer. However, receding surface 44 may be found to be similarly effective in the form of a partially-spherical or concave surface, a step-shoulder chamfer surface, etc. In a simple chamfer form, a preferred chamfer angle B between receding surface 44 and end wall 42 is approximately 30°.

In the construction illustrated in FIGS. 2 and 3, a pair of O-ring seals 45 and 46 encircle and are mounted on the tube 11 adjacent upset bead 40. It will be understood that a single O-ring seal or plurality of O-ring seals can be substituted for seals 45 and 46. Furthermore, other seal constructions can be substituted for or used in combination with seals 45 and 46.

Tube 11 can be made of commercially available material having a non-uniform outside diameter. It is preferred that during formation of upset bead 40 that the outside diameter of tube 11 adjacent upset bead 40 be sized uniformly to receive seals 45 and 46. For example, tube 11 can be formed from Nylon with a nominal outside diameter of 0.122 inch. The portion of tube 11 adjacent upset bead 40 can be sized to a uniform outside diameter of 0.125 inch for an axial length of 0.25 inch.

In the coupled assembly position of the connector 10, adapter 12 and tube 11 as shown in FIG. 2, the O-ring seals 45 and 46 encircling the tube 11 are compressed between the outer peripheral surface of the tube 11 and the inner annular wall 23 of adapter 12. Seals 45 and 46 are forced into receding surfaces 39 and 44, respectively, to retain seals 45 and 46 on tube 11, particularly during installation and removal of connector 10 to adapter 12. Receding surfaces 39 and 44 force seals 45 and 46 toward the outer surface of tube 11 and reduce the tendency of seals 45 and 46 to "crawl" over the annular rim 41 of upset bead 40 and/or the end wall 37 of plug 31. Furthermore, receding surfaces 39 and 44 tend to reduce the tendency of O-ring seals 45 and 46 to cross prior to assembly of connector 10 with adapter 12, e.g. during handling and shipping of a subassembly comprising tube 11, seals 45 and 46 and connector 10.

The connector 10 and the adapter 12 are releasably retained in the above described coupled assembly position by means of the spring retainer 14 which is normally carried by the connector 10. The spring retainer 14, in the construction illustrated, is in the form of a clip having spaced apart leg portions 50 and 51 that extend through the slots 38 in the connector 10 in position to yieldingly engage into the annular groove 26 in the adapter 12 to effect axial retention of these elements. Spring retainer 14, formed of round spring wire, includes a single loop 52 with crossing arms 53 and 54, comprising straight portions extending substantially tangentially from the loop 52 in opposite directions from the point where the loop is completed. Crossing arms 53 and 54 are connected to one end of the retainer legs 50 and 51, respectively, so that these legs 50 and 51 are substantially parallel to each other and, in effect, are hinged together through the arms 53 and 54 and the interconnecting loop 52. At their opposite ends, the legs 50 and 51 are joined to crossing straight arms 55 and 56, respectively. Arms 55 and 56 terminate in spaced apart distal ends 57 and 58, respectively. The distal ends 57 and 58 are positioned so as to be either gripped manually or by a pair of pliers to force these ends toward each other so as to cause legs 50 and 51 to spread apart. When separated, legs 50 and 51 can be released from the annular groove 26 in the adapter 12 to permit separation or disconnection of the connector 10 form adapter 12.

It will be realized that the extension between the set of arms 53 and 54 and the set of arms 55 and 56 is sufficiently larger than the outside diameter of the collar portion 30 of connector 10 to permit the legs 50 and 51 to extend through the slots 38 in chordal respect relative to collar 30. As shown, the outer periphery of the socket end 22 of the adapter 12 is provided with a conical ramp surface 22a adjacent its free or leading end to effect expansion or spreading apart of the legs 50 and 51 during assembly of the connector 10 to the adapter 12 so that the spring legs will ride up over the outer peripheral surface of adapter 12 to then drop into the annular groove 26 therein.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A quick connect coupling comprising:
   (a) a tubular adapter having a stepped cylindrical opening therethrough defining at one end a socket,
   (b) a connector having body means at one end defining an annular collar encircling a tubular plug and forming a cavity to slidably receive one end of the adapter with the tubular plug slidably received into the socket and retaining means for retaining said one end of said adapter in said cavity,
   (c) a flexible tube slidably received by the tubular plug, the tube having an annular upset bead at one end extending axially outwardly of the tubular plug, encircled by the collar and receivable in the socket,
   (d) at least a pair of adjoining O-ring seals mounted on the tube between the upset bead and the end of the tubular plug,
   (e) first receding surface means provided at the end surface of the upset bead adjacent said tubular plug, and
   (f) second receding surface means provided at the end surface of the tubular plug adjacent the upset bead, whereby when the tube is inserted into the socket, the O-ring seals are radially compressed into engagement with the first and second receding surface means to retain the O-ring seals between the upset bead and the tubular plug.

2. The coupling as specified in claim 1 wherein the first receding surface means comprises a chamfer.

3. The coupling as specified in claim 1 wherein the second receding surface means comprises a chamfer.

4. The coupling as specified in claim 1 wherein each of the first and second receding surface means comprises a chamfer.

5. The coupling as specified in claim 1 wherein said retaining means includes:
   (a) the collar of the connector includes diametrically opposed slots extending therethrough,
   (b) the adapter includes an annular groove on its outer peripheral surface aligned with the connector slots when the connector is fully coupled relative to the adapter, and
   (c) a spring retainer means having spaced apart leg portions loosely received in the connector slots for yielding engagement in the annular groove of the adapter.

6. A quick connect coupling comprising:
   (a) a tubular connector having a bored opening at a first end and a bored cavity at a second end, the cavity in communication with and having a larger diameter than the opening;
   (b) an annular plug, provided inside the cavity, having a bored opening in communication with the opening at the connector first end;
   (c) a tube, slidably received in the openings of the connector first end and the annular plug, terminating in an annular upset bead positioned in the cavity, the upset bead having a larger outer diameter than the outer diameter of the plug opening;
   (d) at least a pair of adjoining O-ring seals mounted on the tube between the upset bead and the plug;
   (e) means for providing a radial, axially-receding surface at an end wall of the upset bead adjacent the seal means; and
   (f) means for providing a radial, axially-receding surface at an end wall of the plug adjacent the seal means.

7. The coupling as specified in claim 6 wherein the means for providing a receding surface at the upset bead end wall comprises a chamfer.

8. The coupling as specified in claim 6 wherein the means for providing a receding surface at the plug end wall comprises a chamfer.

9. The coupling as specified in claim 6 wherein each of the means for providing a receding surface comprises a chamfer.

10. The quick connect coupling as specified in claim 6 including:
    (a) a tubular adapter for attachment at the second end of the connector, the adapter having a cylindrical opening in communication with the connector cavity when the adapter and connector are assembled; and
    (b) means for retaining the adapter to the connector.

11. A quick connect coupling comprising:
    (a) a tubular connector having a bored opening at a first end and a bored cavity at a second end, the cavity in communication with and having a larger diameter than the opening;
    (b) an annular plug, provided inside the cavity, having a bored opening in communication with the opening at the connector first end;
    (c) a tube, slidably received in the openings of the connector first end and the annular plug, terminating in an annular upset bead positioned in the cavity, the upset bead having a larger outer diameter than the outer diameter of the plug opening;
    (d) a pair of O-ring seals mounted side-by-side on the tube between the upset bead and the plug;
    (e) a first chamfer provided at an end wall of the upset bead adjacent the O-ring seals for receiving one of the seals; and
    (f) a second chamfer provided at an end wall of the plug adjacent the O-ring seals for receiving the other of the seals.

12. The coupling as specified in claim 11 wherein the chamfer angle at the upset bead end wall is approximately 30°.

13. The coupling as specified in claim 11 wherein the chamfer angle at the plug and wall is approximately 30°.

* * * * *